(12) United States Patent
Leuze et al.

(10) Patent No.: US 7,237,985 B2
(45) Date of Patent: Jul. 3, 2007

(54) CUTTING PLATE FOR ROTATING TOOLS

(75) Inventors: Peter Leuze, Walheim (DE); Frank Roeser, Gemmrigheim (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 389 days.

(21) Appl. No.: 10/344,796

(22) PCT Filed: Jul. 11, 2001

(86) PCT No.: PCT/EP01/08001

§ 371 (c)(1),
(2), (4) Date: Feb. 14, 2003

(87) PCT Pub. No.: WO02/14003

PCT Pub. Date: Feb. 21, 2002

(65) Prior Publication Data

US 2003/0180109 A1    Sep. 25, 2003

(30) Foreign Application Priority Data

Aug. 16, 2000  (DE) ............................... 100 40 612

(51) Int. Cl.
*B23B 51/02*    (2006.01)

(52) U.S. Cl. ...................... 408/227; 408/188; 407/113

(58) Field of Classification Search ................ 408/188, 408/227, 230, 187, 713, 233; 407/113
See application file for complete search history.

(56) References Cited

U.S. PATENT DOCUMENTS 4,115,024 A * 9/1978 Sussmuth .................... 407/114

(Continued)

FOREIGN PATENT DOCUMENTS

DE        44 00 570        8/1994

(Continued)

*Primary Examiner*—Dana Ross
(74) *Attorney, Agent, or Firm*—Flynn, Thiel, Boutell & Tanis, P.C.

(57) ABSTRACT

A cutting plate for rotating tools includes a major cutting edge connected to a minor cutting edge in a radial extension thereof over a cutting corner. A common face joins a longitudinal side of the major cutting edge and the minor cutting edge, while a major flank or a minor flank joins the other side of the major and minor cutting edges. The flank face form a wedge angle The tool is supported on a boring wall with low friction to enable vibration-free machining. A support land near the minor cutting edge has two interspaced support edges. The support edges have the same radial distance from the tool axis over their entire length. The support edges are oriented parallel to the tool axis and the support land has a flat surface parallel to the tool axis.

17 Claims, 3 Drawing Sheets

U.S. PATENT DOCUMENTS

| | | | | |
|---|---|---|---|---|
| 4,297,058 A | * | 10/1981 | Armbrust et al. | 407/113 |
| 4,367,991 A | * | 1/1983 | Grafe et al. | 408/224 |
| 4,844,669 A | * | 7/1989 | Tsujimura et al. | 408/188 |
| 4,934,878 A | * | 6/1990 | Plutschuck et al. | 407/42 |
| 5,244,318 A | * | 9/1993 | Arai et al. | 407/42 |
| 5,755,536 A | | 5/1998 | Vollmer et al. | |
| 5,829,927 A | * | 11/1998 | Nakamura et al. | 408/230 |
| 6,200,077 B1 | * | 3/2001 | Svenningsson et al. | 408/230 |
| 6,238,151 B1 | * | 5/2001 | Takagi | 408/230 |
| 6,257,807 B1 | * | 7/2001 | Heinloth | 407/113 |
| 6,872,035 B2 | * | 3/2005 | Kress et al. | 408/1 R |
| 6,874,979 B2 | * | 4/2005 | Takiguchi et al. | 408/227 |
| 2004/0028491 A1 | * | 2/2004 | Fritsch et al. | 408/227 |

FOREIGN PATENT DOCUMENTS

| | | |
|---|---|---|
| DE | 195 16 893 | 11/1996 |
| EP | 0 577 011 | 1/1994 |
| JP | 56033214 A * | 4/1981 |

* cited by examiner

CUTTING PLATE FOR ROTATING TOOLS

FIELD OF THE INVENTION

The invention relates to a cutting plate for tools rotating about a tool axis, in particular for boring tools with several cutting edges, comprising a major cutting edge and a minor cutting edge, which is connected, in the extension of said major cutting edge radially outwardly through a plate corner, at an angle to said major cutting edge, comprising a common machining surface connected on one longitudinal side of the major cutting edge and of the minor cutting edge, and comprising one major flank or minor flank connected to the other longitudinal side of the major cutting edge or the minor cutting edge, and defining a wedge angle with the common machining face.

BACKGROUND OF THE INVENTION

In order to avoid vibrations during operation in far projecting tools with several cutting edges and with cutting plates of the aforementioned type, a minor cutting edge designed as a guiding edge is provided which is guided along the bore wall. In order to achieve the guiding action, the guiding edge is usually provided with a circular grinding, the radius of curvature of which is smaller than the radius of the bore. This means that the guiding edge is guided along a line on the bore wall. When the circular grinding has a radius which is too small, the guiding becomes relatively poor. The tool chatters because it gets caught on or cuts into the boring wall with the guiding edge. When approaching the bore radius there occurs a surface contact, which increases the friction between the tool and the bore, and which can result in overloads on the machine and/or the tools. The more cutting edges that are arranged over the circumference of the tool, the more serious this effect becomes.

Starting out from this, the basic purpose of the invention is to improve the cutting plates of the above-identified type in such a manner that an optimum support action with a minimum friction results in the area of the minor cutting edge.

To attain this purpose the characteristics disclosed in claim 1 are suggested. Advantageous embodiments and further developments result from the dependent claims.

The inventive solution is based on the thought that a support land is arranged in the area of the minor cutting edge, which support land is defined by two support edges arranged at a distance from each other in the direction of rotation of the tool, which support edges are spaced over their entire length at the same radius distance forming at the same time the flight-circle radius of the tool from the tool axis. Advantageously, the support edges thereby extend in their longitudinal extent parallel to the tool axis, whereas the support land provided between the support edges is designed preferably as a flat surface. The support land advantageously has in its longitudinal extent aligned parallel to the tool axis a length, which length corresponds at least to twice the distance between the support edges. In order to obtain-a minimal friction support, the support edges should be spaced, depending on the bore diameter, at a distance of 0.1 to 1.5 mm from each other. The support land between the support edges thereby advantageously extends over a fraction of the cutting-plate thickness. The support land extends in its longitudinal extent to the, if applicable, rounded or faceted cutting-edge corner. The support edges can be faceted rounded or preferably tangential to the tool flight circle.

A preferred embodiment of the invention provides that the major cutting edge and the minor cutting edge designed as a support land define a right angle with each other in their longitudinal extent.

The inventive cutting plate can be designed both as an exchangeable cutting plate with only one cutting-edge corner and also as an indexable insert with several cutting-edge corners. At least two major cutting edges and secondary cutting edges arranged at equal angular distances from each other are provided in the latter case. The cutting plate is advantageously designed as a triangular-like insert with three major cutting edges having a roof shape and a point angle of 140 to 170°, whereby the support land, which is part of a major cutting edge, is formed into the corner area of a major cutting edge adjacent in a defined index direction.

The inventive measures are suited both for use in solid drills and also in core drills and reamers, and thereby are preferably useful in far projecting or long tools with several cutting edges. The tendency of the boring tool to vibrate is reduced by the minimal friction support and guiding in the bore.

BRIEF DESCRIPTION OF THE DRAWINGS

The invention will be discussed in greater detail hereinafter in connection with the drawings, in which.

DETAILED DESCRIPTION

Figure 1:
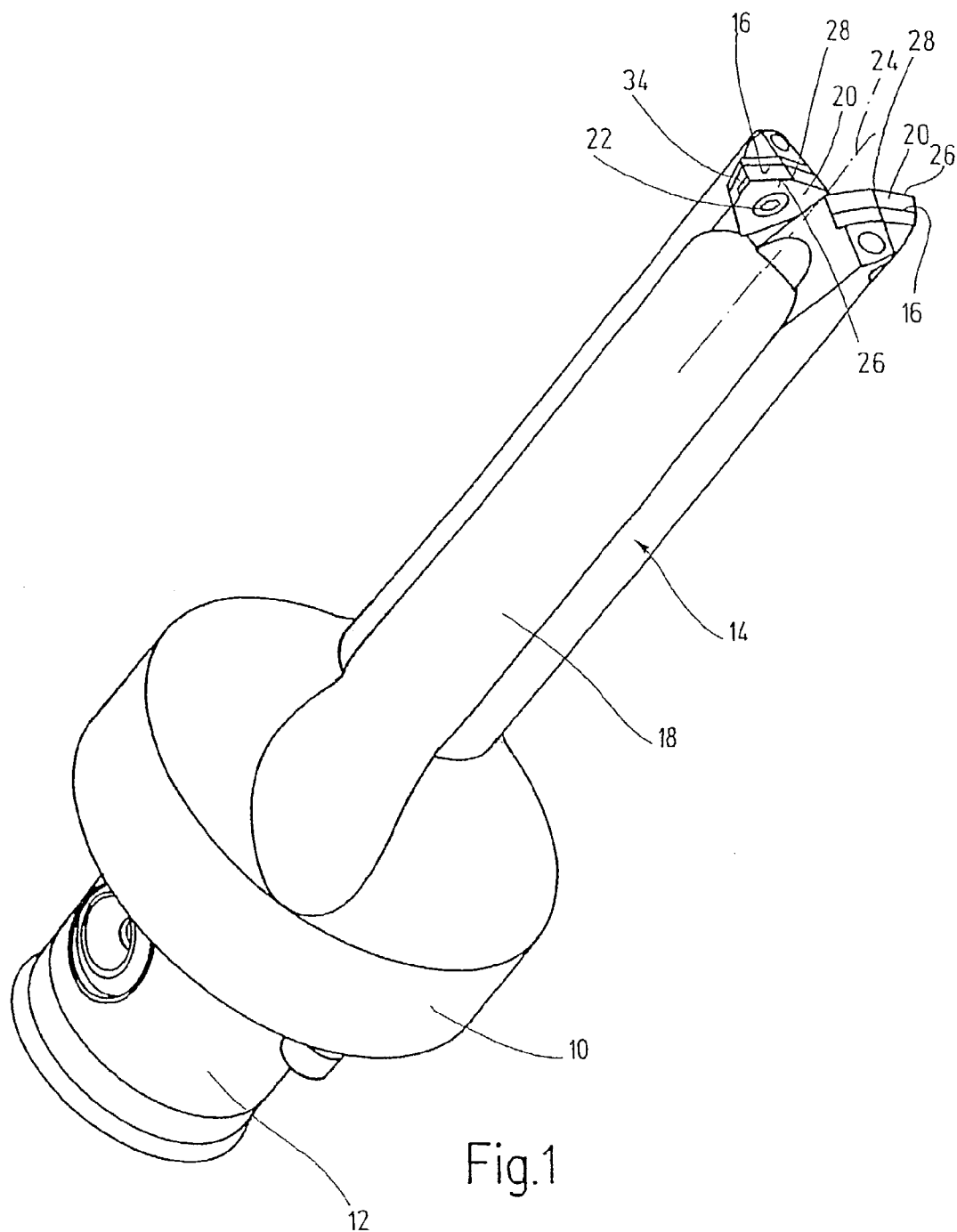
FIG. 1 is a diagrammatic illustration of a boring tool, which has double cutting edges and indexable triangular-shaped inserts.

The boring tool illustrated in the drawings is designed as a core drill with double cutting edges. The boring tool is designated for use in machine tools and has for this purpose a coupling shaft 12 for connection to a not illustrated tool spindle, which coupling shaft 12 is defined by a coupling flange 10 for a plane-surface bearing. An elongated base body 14 is also connected to the coupling flange 10, which base body 14 has in the area of its face-side end two plate seats 16, from where chip-conveying grooves 18 extend over the length of the base body 14. Two trigon indexable inserts or cutting plates 20, which are designed alike, are exchangeably arranged in the plate seats 16 and are secured on the base body 14 by fastening screws 22. The fastening screws are thereby screwed into the base body 14 starting out from the chip-conveying grooves essentially perpendicularly with respect to the drill axis 24.

Figure 4:
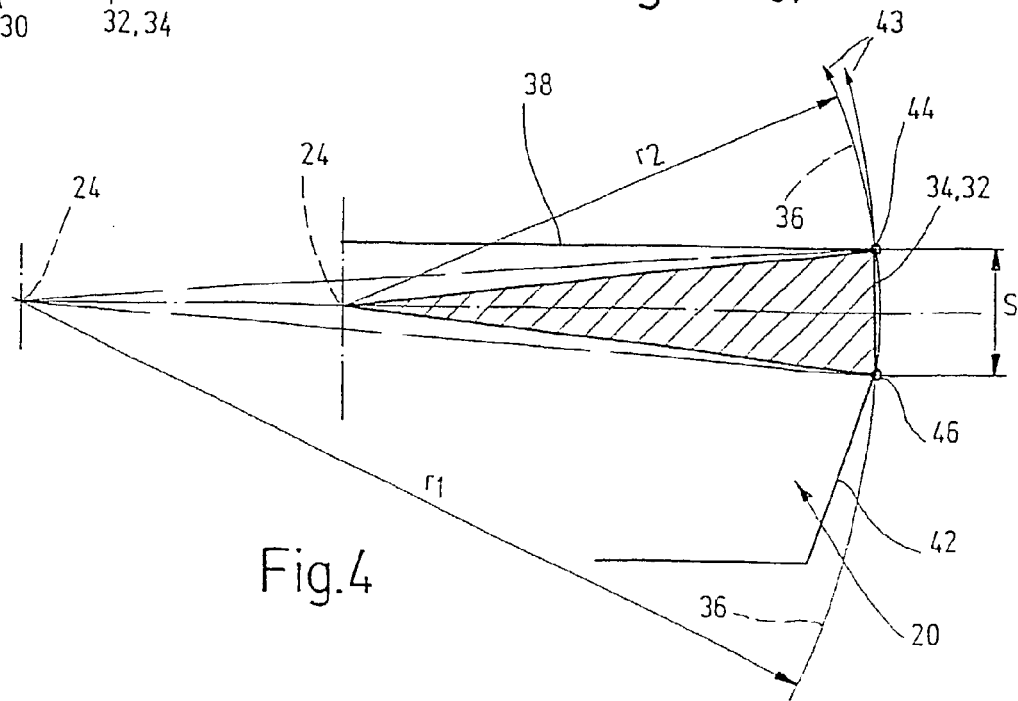
FIG. 4 is an enlarged cutout section of a side view of the indexable insert with a support land in a schematic illustration within the drill geometry.

Each of the cutting plates has three major cutting edges 26, of which one is active in the installed state. The major cutting edges 26 have a roof-shaped tip 28, whereby the one leg 26' of the major cutting edge extends rectilinearly from the tip 28 toward the cutting-edge corner 30, and the other leg 26" has a further obtuse-angled bend 32 toward the other cutting-edge corner 30. The angle of the roof-shaped tip 28 and the obtuse angle in the area of the bend 32 are thereby dimensioned such that between the major cutting-edge leg 26' and the adjacent bend 32 there is created an angle of 70° to 110°, and preferably an angle of 90°. The bend 32, which is adjacent to the respective major cutting-edge leg 26' through the cutting-edge corner 30, forms in the installed state a minor cutting edge, which is followed by a guide and support land 34 for supporting the tool on the boring wall 36 (FIG. 4).

The cutting plate has furthermore a machining face 38 ending in the chip-conveying groove 18, and a major flank 40 forming a cutting wedge with the machining face. The minor cutting edge 32 is defined at its one longitudinal side by the common machining face 38, whereas the other side of the support land 34 is followed by a minor flank 42.

Figure 2:
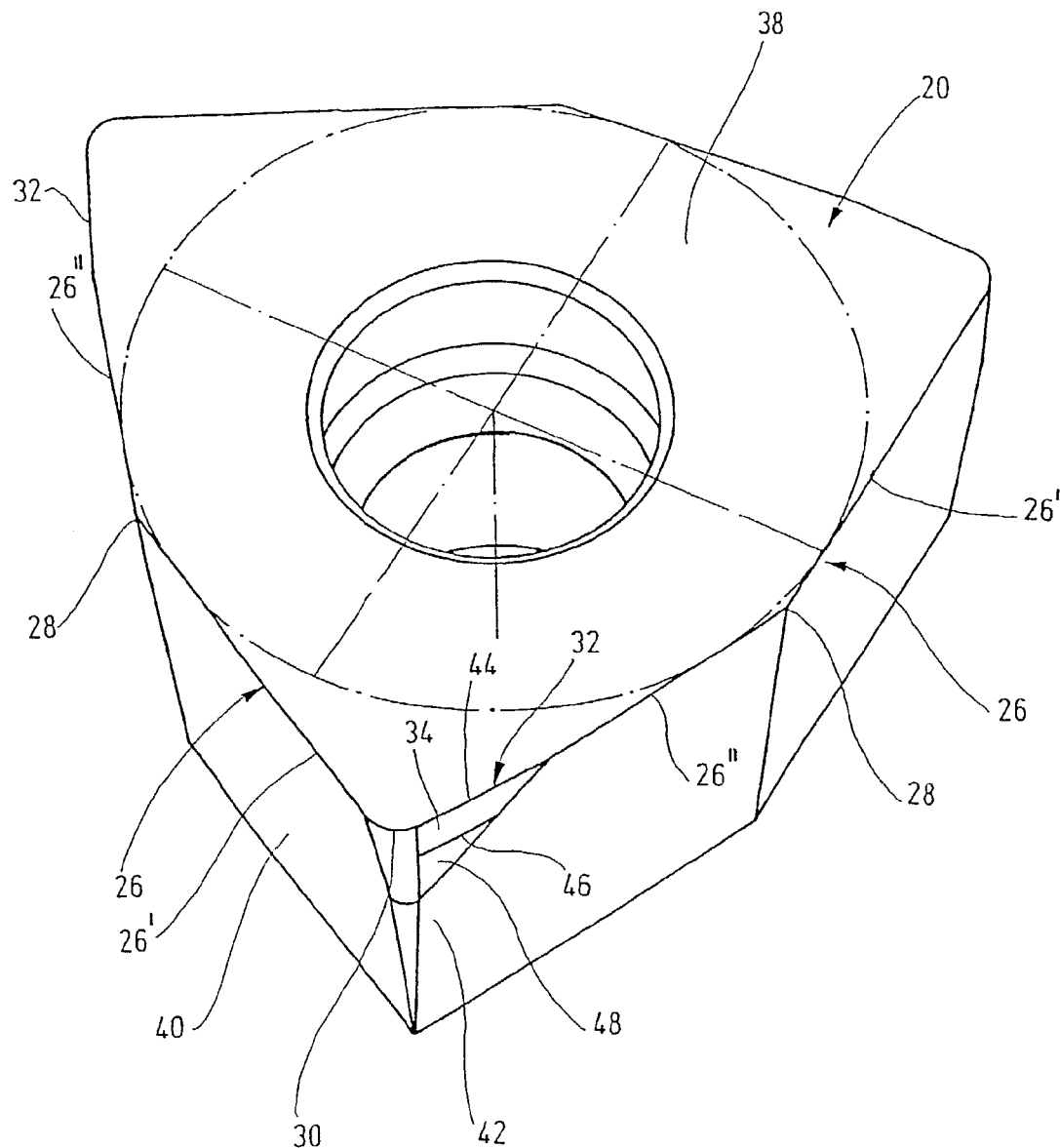
FIG. 2 is a diagrammatic illustration of an indexable triangular-shaped insert.
Figure 3B:
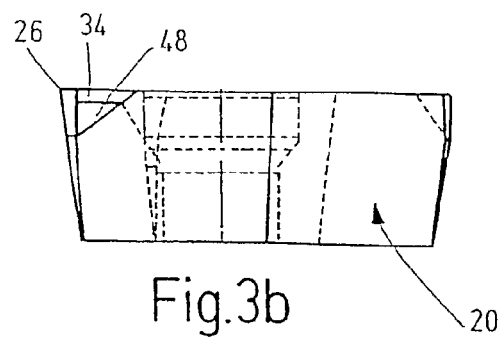
FIGS. 3a, 3b and 3c are a top view and two side views of the triangular-shaped insert according to FIG. 2.
Figure 3A:
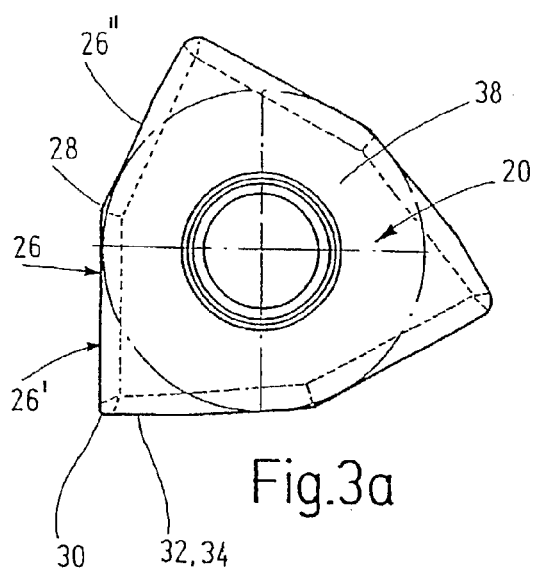
Figure 3C:
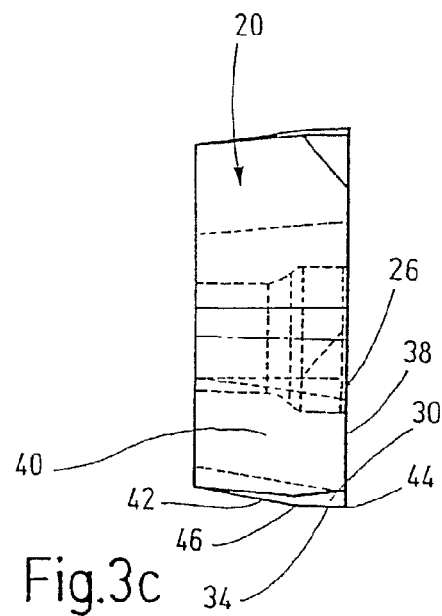

The support land 34 is defined by two support edges 44, 46, which are arranged in a direction of rotation 43 of the tool at a distance s from each other, and which have over their entire length the same radius distance $r_1$ or $r_2$ from the tool axis 24, which radius distance corresponds to the flight-circle radius of the tool. As can be seen from FIG. 2 in connection with FIG. 4, the support edges 44, 46 extend parallel to the tool axis 24. However, the support edges 44, 46 have different lengths in the illustrated exemplary embodiment in view of the additional triangle land 48. The support land 34 as such is here designed as a flat surface parallel to the tool axis 24 (compare FIG. 3c and FIG. 4).

With the described measures, the tool can be supported with minimal friction on the boring wall 36 through the support edges 44, 46 of the support land 34 during the drilling operation, and one and the same cutting plate can be utilized for various bore radii $r_1$, $r_2$.

In summary the following is to be stated: The invention relates to a cutting plate for tools rotating about a tool axis, and in particular for boring tools with several cutting edges. The cutting plate has a major cutting edge 26 and a minor cutting edge 32, which minor cutting edge 32 is connected, in the extension of said major cutting edge 26 radially outwardly through a cutting-edge corner 30, at an angle to said major cutting edge 26. A common machining face 33 is connected to the one longitudinal side of the major cutting edge 26 and of the minor cutting edge 32, whereas a major flank 40 or a minor flank 42 is connected to the other longitudinal side of the major cutting edge 26 and of the minor cutting edge 32, which major flank 40 or minor flank 42 defines a wedge angle with the machining face. In order to be able to support the tool with minimum friction on the boring wall 36, and in order to thereby enable also in the case of far projecting tools an essentially vibration-free machining, it is suggested according to the invention to arrange in the area of the minor cutting edge 32 a support land 34, which is defined by two support edges 44, 46 arranged at a distance from each other in the direction of rotation of the tool, whereby the support edges have over their entire length the same radius distance $r_1$ or $r_2$ from the tool axis 24. The support edges 44, 46 are advantageously aligned parallel to the tool axis 24, whereas the support land is designed advantageously as a flat surface parallel to the tool axis 24.

What is claimed is:

1. A cutting plate for tools rotating about a tool axis, comprising a major cutting edge and a minor cutting edge, which is connected, in the extension of said major cutting edge radially outwardly through a cutting-edge corner, at an angle to said major cutting edge, comprising a common machining surface connected to one longitudinal side of the major cutting edge and of the minor cutting edge, and comprising a major flank or a minor flank connected to the other longitudinal side of the major cutting edge or the minor cutting edge, and each defining a wedge angle with the common machining surface, wherein in the area of the minor cutting edge there is arranged a support land having a flat surface parallel to a tool axis, which is defined by two support edges extending parallel to a tool axis and spaced at a distance of 0.1 mm to 1.5 mm from each other in a direction of rotation of the tool, wherein the support edges have over their entire length the same radius distance ($r_1$ or $r_2$) from a tool axis.

2. The cutting plate according to claim 1, wherein the support land has a length in its longitudinal extent aligned parallel to a tool axis, which length corresponds at least to twice the distance between the support edges.

3. The cutting plate according to claim 1, wherein the support land extends between the support edges over a fraction of the cutting-plate thickness.

4. The cutting plate according to claim 1, wherein the support land extends in its longitudinal extent to the cutting-edge corner, the corner comprising a rounded or faceted cutting-edge corner.

5. The cutting plate according to claim 1, wherein the major cutting edge and the minor cutting edge define an angle of 70° to 110° in their longitudinal extent.

6. The cutting plate according to claim 1,
wherein the cutting plate comprises an indexable insert and said major cutting edge comprises one of at least two major cutting edges and said support land comprises one of at least two support lands arranged at equal angular distances from each other.

7. The cutting plate according to claim 6, comprising a trigon insert with three major cutting edges having a roof shape with a point angle of 140° to 170°.

8. The cutting plate according to claim 6, wherein the support land, which belongs to the respective major cutting edge, is formed into a corner area of the major cutting edge adjacent in a defined index direction.

9. A tool for use in machine tools comprising a base body rotatable about a tool axis, and comprising at least one cutting plate exchangeably inserted into a plate seat of the base body, the cutting plate having a major cutting edge, a minor cutting edge connected, in the extension of said major cutting edge radially outwardly through a cutting-edge corner, to said major cutting edge at an angle, a common machining face connected on one longitudinal side of the major cutting edge and of the minor cutting edge, and a major flank or a minor flank connected on the other longitudinal side of the major cutting edge or the minor cutting edge, and each defining a wedge angle with the common machining face, wherein in the area of the minor cutting edge there is arranged a support land having a flat surface parallel to the tool axis, said support land defined by two support edges spaced at a distance of 0.1 mm to 1.5 mm from each other in a direction of rotation of the tool, and extending parallel to the tool axis, wherein the support edges have over their entire length the same radius distance ($r_1$ or $r_2$) from the tool axis.

10. The tool according to claim 9, wherein the support land has a length in its longitudinal extent aligned parallel to the tool axis, which length corresponds at least to twice the distance between the support edges.

11. The tool according to claim 9, wherein the support land extends between the support edges over a fraction of the cutting-plate thickness.

12. The tool according to claim 9, wherein the support land extends in its longitudinal extent to the cutting edge corner, the cutting edge corner comprising a rounded or faceted cutting-edge corner.

13. The tool according to claim 9, wherein the major cutting edge and the minor cutting edge define an angle of 70° to 110° in their longitudinal extent.

14. The tool according to claim 9, wherein the at least one cutting plate comprises an indexable insert and said major cutting edge comprises one of at least two major cutting edges and said support land comprises one of at least two support lands arranged at equal angular distances from each other.

15. The tool according to claim 14, wherein the at least one cutting plate comprises a trigon insert with three major cutting edges having a roof shape with a point angle of 140° to 170°.

16. The tool according to claim 14, wherein the support land, which belongs to the major cutting edge, is formed into the corner area of the major cutting edge adjacent in a defined index direction.

17. A tool for use in machine tools comprising:
- a base body rotatable about a tool axis, the base body having plate seats and respective chip conveying grooves; and
- indexable inserts exchangeably inserted and secured in each said plate seat of said base body, each said indexable insert having a common machining face, and each said indexable insert having a plurality of identical side edges about the common machining face, each side edge comprising:
  - a major cutting edge;
  - a major cutting edge extension defined by a minor flank, said major cutting edge extension joining said major cutting edge to define a wedge angle and to define a roof-shaped tip at the common machining surface;
  - a minor cutting edge joining said major cutting edge extension radially outwardly through a cutting-edge corner, to said major cutting edge at an angle; and
  - a support land adjoining the minor cutting edge, the support land having a flat surface parallel to the tool axis, said support land defined by two support edges extending parallel to the tool axis, the support edges over their entire length having an identical radius distance from the tool axis,
- wherein the support edges contact a bore being formed by said tool to minimize vibration of said tool therein, and to minimize friction in the bore by contacting the bore at the support edges and not at the support land between the support edges.

* * * * *